(12) United States Patent
Klyuchevskyy et al.

(10) Patent No.: US 9,141,803 B2
(45) Date of Patent: Sep. 22, 2015

(54) SELF-HEALING OF OPERATING SYSTEM COMPONENTS

(71) Applicant: Microsoft Corporation, Redmond, WA (US)

(72) Inventors: Andriy Klyuchevskyy, Redmond, WA (US); Richard Lewis, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 13/776,751

(22) Filed: Feb. 26, 2013

(65) Prior Publication Data

US 2014/0244988 A1 Aug. 28, 2014

(51) Int. Cl.
*G06F 21/57* (2013.01)

(52) U.S. Cl.
CPC ............ *G06F 21/572* (2013.01); *G06F 21/575* (2013.01)

(58) Field of Classification Search
CPC .................................................... G06F 9/4401
USPC .............................................................. 713/2
See application file for complete search history.

(56) References Cited

U.S. PATENT DOCUMENTS

| | | | |
|---|---|---|---|
| 5,168,566 A | 12/1992 | Kuki et al. | |
| 5,428,782 A | 6/1995 | White | |
| 6,044,394 A | 3/2000 | Cadden et al. | |
| 6,594,781 B1 * | 7/2003 | Komasaka et al. | ............. 714/19 |
| 6,772,419 B1 | 8/2004 | Sekiguchi et al. | |
| 6,880,110 B2 | 4/2005 | Largman et al. | |
| 7,185,071 B2 * | 2/2007 | Berg et al. | ...................... 709/220 |
| 7,415,597 B2 | 8/2008 | Filippo et al. | |
| 7,424,714 B2 | 9/2008 | Jiang | |
| 7,523,340 B2 * | 4/2009 | Muthukumarasamy et al. | . 714/2 |
| 7,640,548 B1 | 12/2009 | Yu | |
| 7,865,901 B2 * | 1/2011 | Breitgand et al. | ............ 719/312 |
| 7,979,749 B2 * | 7/2011 | Jann et al. | ..................... 714/38.1 |
| 8,028,277 B2 * | 9/2011 | Breitgand et al. | ............ 717/130 |
| 8,082,471 B2 * | 12/2011 | Khan | ........................... 714/38.1 |
| 8,387,066 B1 | 2/2013 | Becher | |
| 8,868,973 B2 * | 10/2014 | Milojicic et al. | ................ 714/26 |
| 8,930,764 B2 * | 1/2015 | Deshpande | ................... 714/38.1 |
| 2003/0120709 A1 | 6/2003 | Pulsipher | |

(Continued)

OTHER PUBLICATIONS

Stacker et al, "What is the difference between the operating system and the kernel?", Jul. 23, 2010, Stack Overflow, pp. 2.*

Ben Joan, "Difference Between Operating System and Kernel", Dec. 25, 2010, DifferenceBetween.net, pp. 6.*

(Continued)

*Primary Examiner* — Suresh Suryawanshi
(74) *Attorney, Agent, or Firm* — Henry Gabryjelski; Kate Drakos; Micky Minhas

(57) ABSTRACT

Aspects of the subject matter described herein relate to operating system technology. In aspects, a mechanism is described that allows self-healing actions to correct operating system problems. The self-healing actions may be performed at virtually any time during the loading and executing of operating system components. Earlier placement of the self-healing actions may allow correction of more operating system component problems than later placement. In one implementation, while self-healing actions are occurring, the instantiating of additional operating system components is not allowed. After the self-healing actions have completed, the instantiating of additional operating system components may continue.

20 Claims, 4 Drawing Sheets

(56) References Cited

U.S. PATENT DOCUMENTS

| | | |
|---|---|---|
| 2004/0049672 A1 | 3/2004 | Nollet et al. |
| 2004/0153823 A1* | 8/2004 | Ansari ............................ 714/38 |
| 2005/0086630 A1* | 4/2005 | Chefalas et al. ............. 717/100 |
| 2006/0136892 A1* | 6/2006 | Branch et al. ................ 717/168 |
| 2006/0143057 A1 | 6/2006 | Sadiq |
| 2006/0230438 A1 | 10/2006 | Shappir |
| 2007/0174101 A1 | 7/2007 | Li |
| 2008/0077933 A1 | 3/2008 | Montagut |
| 2008/0244565 A1* | 10/2008 | Levidow et al. ............. 717/176 |
| 2009/0100129 A1 | 4/2009 | Vigil |
| 2009/0313636 A1 | 12/2009 | Barsness et al. |
| 2010/0050183 A1 | 2/2010 | Ogura |
| 2011/0131448 A1 | 6/2011 | Vasil |
| 2011/0154443 A1 | 6/2011 | Thakur |
| 2012/0102363 A1* | 4/2012 | Milojicic et al. ................ 714/37 |

OTHER PUBLICATIONS

Becker, et al., "Exploiting Inter Task Dependencies for Dynamic Load Balancing", In Proceedings of IEEE Third International Symposium on High-Performance Distributed Computing, Aug. 2, 1994, 9 pages.

"Windows 7—The only "Self-Healing" Operating System", Retrieved at <<http://forum.thewindowsclub.com/windows-7-management-support/29293-windows-7-only-self-healing-operating-system.html, Jan. 11, 2009, pp. 4.

Klyuchevskyy et al., "Dynamic Dependency Evaluation for Computing Task Execution", U.S. Appl. No. 13/645,682, filed Oct. 5, 2012, pp. 34.

U.S. Appl. No. 13/645,682, Office Action dated Oct. 6, 2014, 15 pages.

U.S. Appl. No. 13/645,682, Amendment dated Jan. 6, 2015, 15 pages.

* cited by examiner

SELF-HEALING OF OPERATING SYSTEM COMPONENTS

BACKGROUND

Operating systems include many components that are interrelated. When one or more components become corrupted, the operating system may not be able to boot or may exhibit other significant problems. Until the operating system is functioning properly, this may greatly frustrate the user. Restoring the operating system to a bootable or good state often requires a specialized set of skills and knowledge that most users simply do not have. If the user is not tech savvy, the user may take the computer to a repair shop to have the operating system repaired which often involves reinstalling the operating system. If the end user is sophisticated enough, the user may reinstall the operating system. Anyone who has reinstalled a modern operating system knows that the installation process takes a long time and often results in lost data and settings.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to operating system technology. In aspects, a mechanism is described that allows self-healing actions to correct operating system problems. The self-healing actions may be performed at virtually any time during the loading and executing of operating system components. Earlier placement of the self-healing actions may allow correction of more operating system component problems than later placement. In one implementation, while self-healing actions are occurring, the instantiating of additional operating system components is not allowed. After the self-healing actions have completed, the instantiating of additional operating system components may continue.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
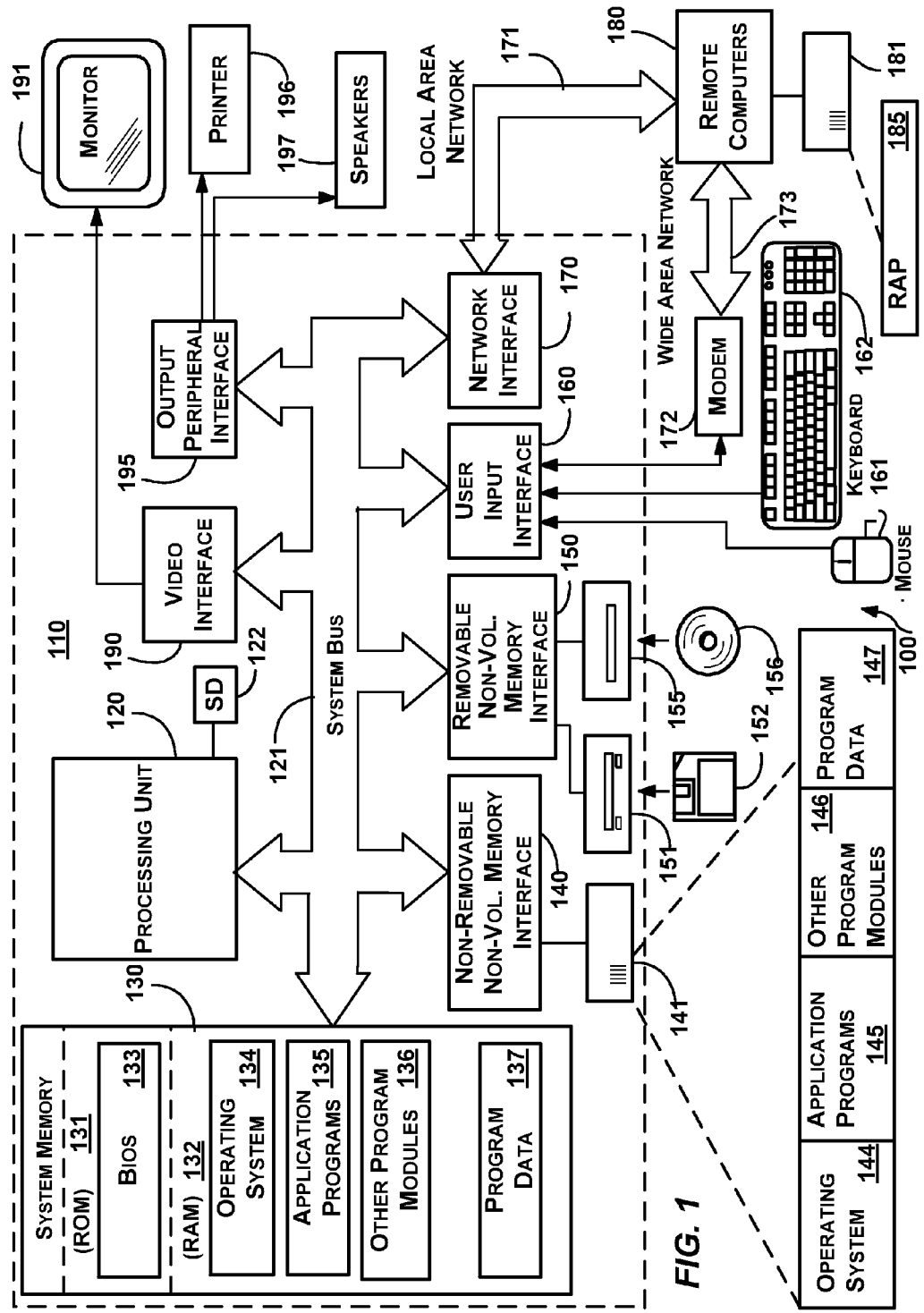
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Self-Healing

Figure 2:
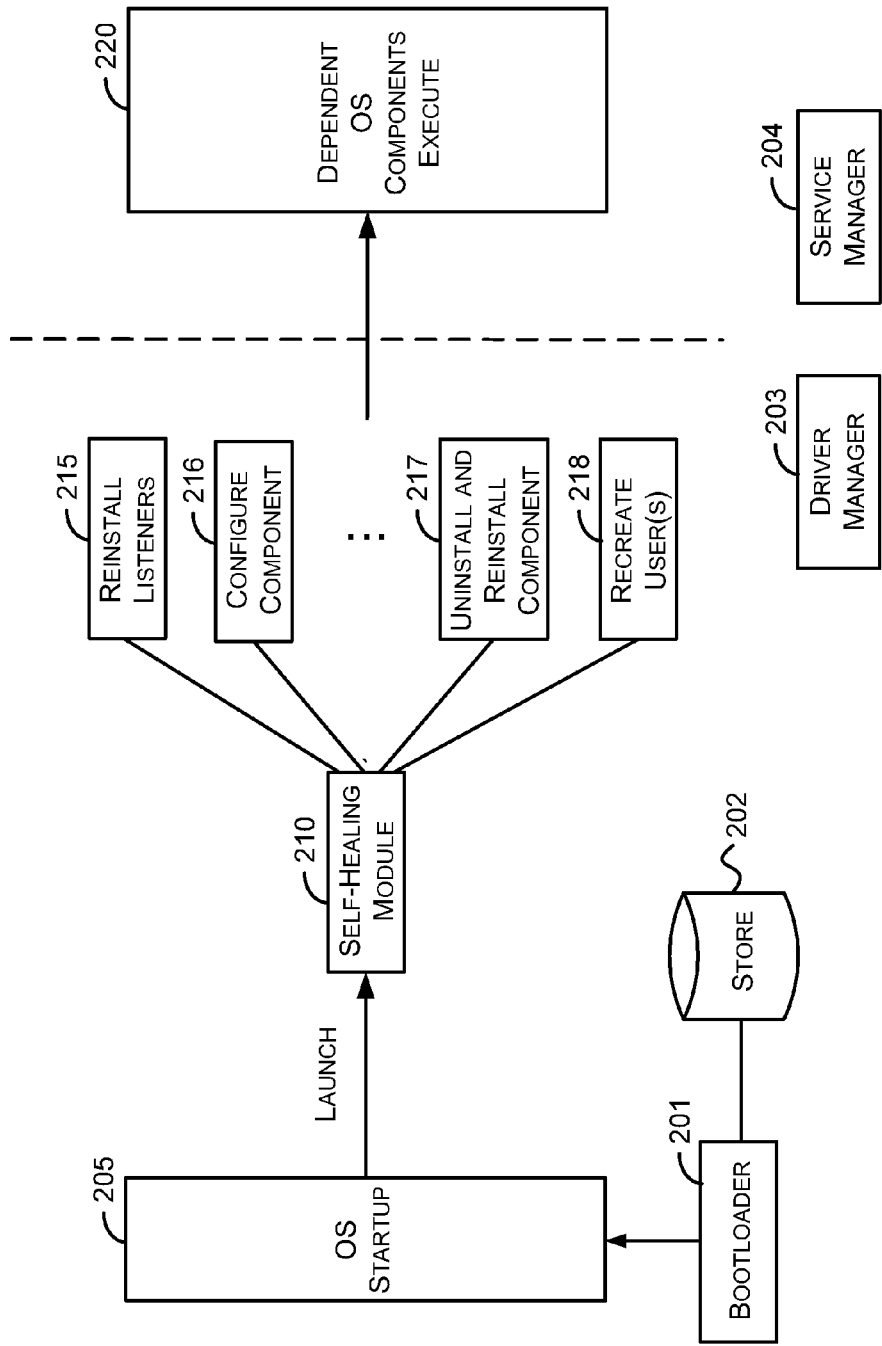
FIG. 2 is a block diagram that generally represents exemplary components and actions for self-healing in accordance with aspects of the subject matter described herein.

As mentioned previously, operating system components may become corrupted. FIG. 2 is a block diagram that generally represents exemplary components and actions for self-healing in accordance with aspects of the subject matter described herein. The components illustrated in FIG. 2 are exemplary and are not meant to be all-inclusive of components that may be needed or included. Furthermore, the number of storage components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

The bootloader 201 may include code that is structured to initiate loading of an initial set of operating system components into memory. The bootloader 201 may obtain the code from the store 202.

The store 202 may include any storage media capable of storing data. A store may include volatile memory (e.g., RAM or other volatile memory described previously) and/or non-volatile memory (e.g., hard drives or other non-volatile memory described previously). A store may be located entirely on one device or may be distributed across multiple devices. A store may be external, internal, or include components that are both internal and external to a storage system hosting the store.

The driver manager 203 may include code that is structured to execute device driver code stored in the memory to instantiate one or more device drivers.

The service manager 204 is structured to execute service code stored in the memory to instantiate one or more services.

At block 205, the bootloader 201 may commence loading into memory an initial set of operating system components. The initial set may include a first set of one or more operating system components and a second set of one or more operating system components. The loading may include fetching the code for the operating system components from non-volatile storage such as a hard disk, for example.

After the first set of one or more operating system components has begun executing and before the second set of operating system components begin executing a self-healing module 210 is executed. Upon executing, the self-healing module 210 may first check whether a management shell of the operating system is executing. This may be done through the user of a flag or other data. A management shell may execute, for example, to configure remote desktop listeners for allowing remote desktop connections. If the management shell is executing, the self-healing module 210 may abort self-healing actions immediately.

If the management shell is not executing or if the self-healing module 210 does not check whether a management shell is executing, the self-healing module 210 may indicate that the second set of operating system components are to wait before executing. Indicating that the second set of operating system components are to wait may include setting a flag or other data, sending a message, calling a function, or the like.

The self-healing module 210 then checks whether one or more of the operating system components are in need of repair.

An operating system may be in need of repair, for example, if any data associated with the operating system component is missing, corrupted, or configured improperly.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The self-healing module 210 may detect whether an operating system component is in need of repair and may then repair the operating system component if it is in need of repair.

Some exemplary repair operations that are illustrated in FIG. 2 include reinstalling listeners 215 (e.g., remote desktop listeners and other listeners), configuring components 216, uninstalling and reinstalling components 217, and recreating user(s) 218.

Some other examples of repair operations include:
1. Creating/resetting a management user account;
2. Setting/fixing autologon options;
3. Configuring a machine setting related to a user;
4. Creating/fixing a firewall rule;
5. Cleaning/removing an old dump file;
6. Creating/fixing remote desktop listeners;
7. Creating/setting user policies;
8. Updating a hibernation file;
9. Updating disk protection;
10. Setting power policies;
11. Configuring an OS component (e.g., such as a service);
12. Uninstalling and reinstalling an OS component; and
13. Other operations like or similar to the operations above.

The repair operations indicated above are not intended to be all-inclusive or exhaustive of the types of repair operations that may occur. Indeed, based on the teachings herein, those skilled in the art may recognize many other types and examples of repair operations that may be performed without departing from the spirit or scope of aspects of the subject matter described herein.

After repair operations have been completed, the self-healing module 210 may indicate that the second set of operating system components are allowed to execute. This is represented by the block 220. The second set of operating system components may be dependent on the operating system components that were checked and possibly repaired by the self-healing module 210.

Figure 3:
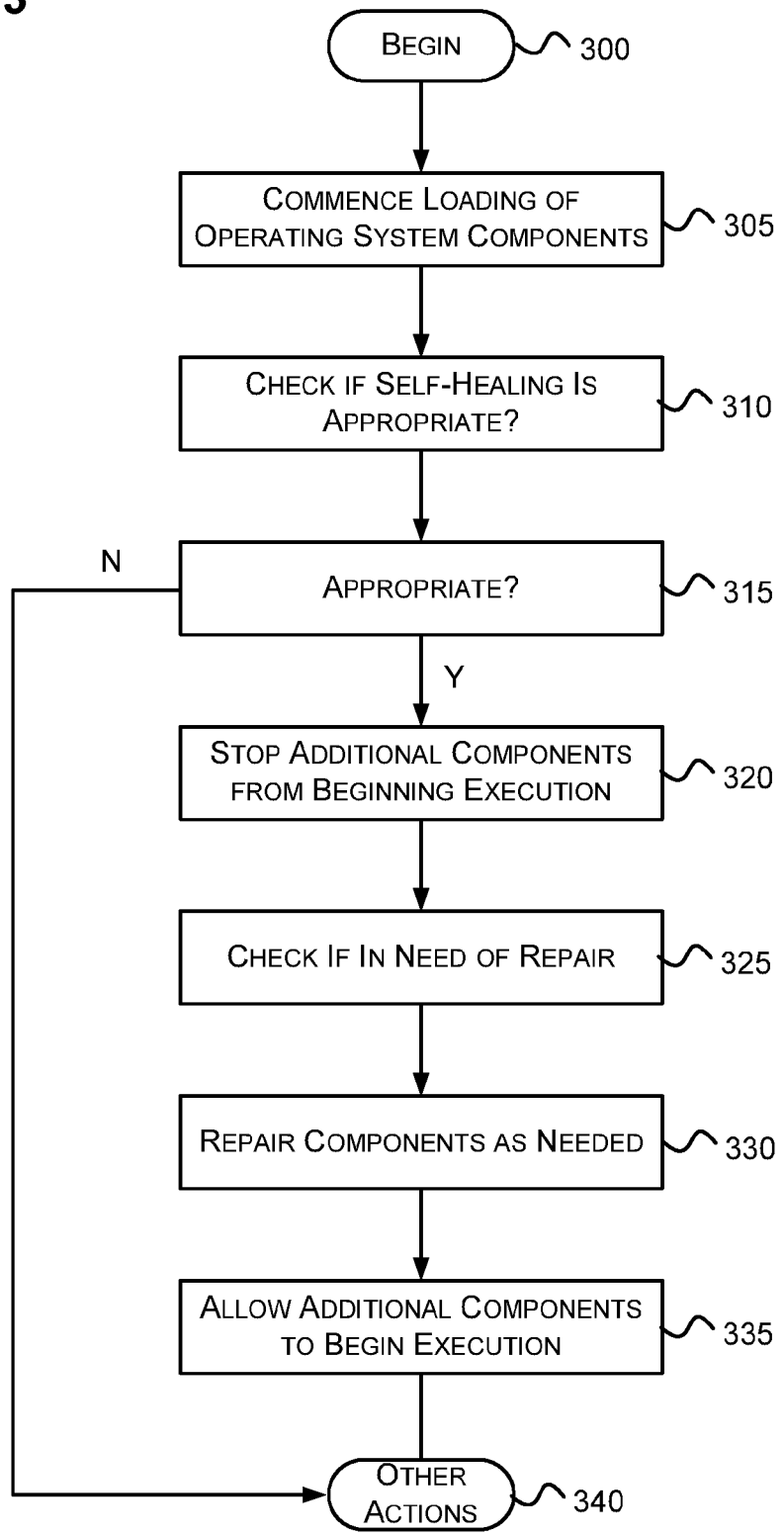
FIGS. 3-4 are flow diagrams that generally represent exemplary actions that may occur in accordance with aspects of the subject matter described herein.
Figure 4:
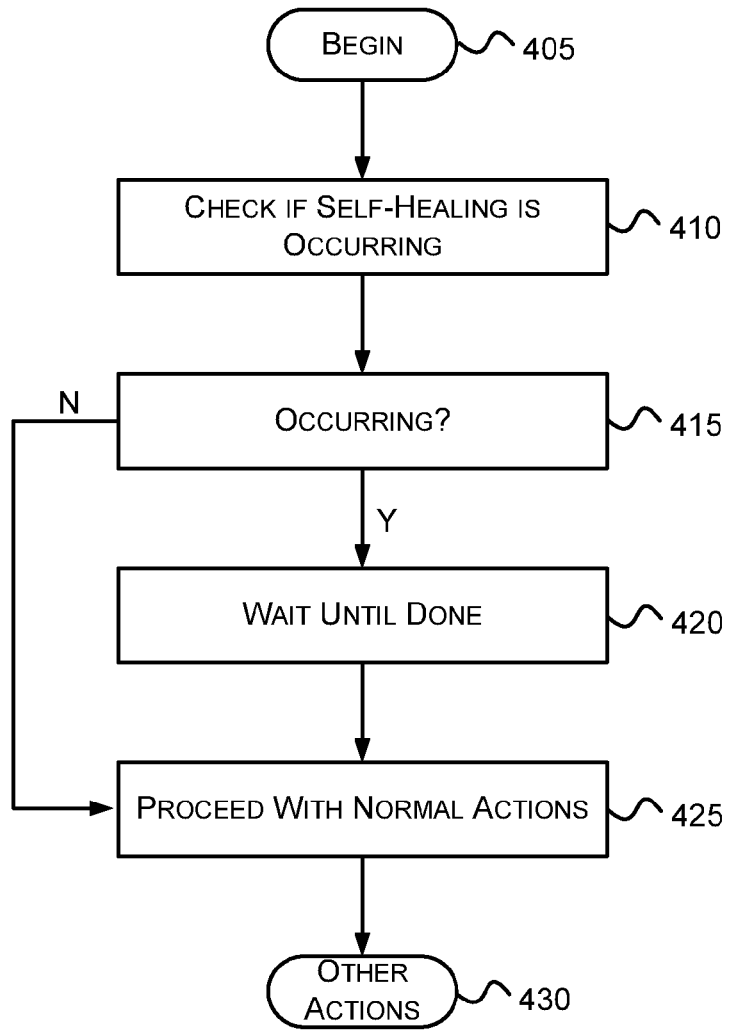

FIGS. 3-4 are flow diagrams that generally represent exemplary actions that may occur in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 300, the actions begin. At block 305, loading is commenced of an initial set of operating system components into a computer memory. For example, referring to FIG. 2, the bootloader 201 may commence loading operating system code from the store 202 into memory. The operating system components may include operating system components that are to have execution begun before the self-healing actions occur and operating system components that are to begin execution after the self-healing actions occur. The operating system components that begin executing prior to the self-healing actions are sometimes referred to as being included in a first set of operating system components while the operating system components that are allowed to begin executing after the self-healing actions are sometimes referred to as being included in a second set of operating system components.

At block 310, a check is performed for whether self-healing actions are to be performed. For example, in one implementation, self-healing actions are not to be performed if a management shell is executing. As another example, self-healing actions are not to be performed if a different operating system component is executing.

At block 315, if self-healing actions are appropriate, the actions continue at block 320; otherwise, the actions continue at block 340.

At block 320, automatically, and without user interaction, self-healing actions are performed. The self-healing actions may include:
1. Indicating that the second set of one or more operating system components are to wait before executing (e.g., block 320). This may be done, for example, as indicated earlier through the use of a flag or otherwise.
2. Checking whether one or more of the operating system components are in need of repair (e.g., block 325). This may involve checking data for corruption, checking for existence of configuration files, checking for the correctness of data, and the like.

3. If an operating system component is in need of repair, repairing the operating system component (e.g., block 330). Repairing the operating system code may include, for example:

A. Creating or re-creating a configuration file associated with the operating system component;

B. Setting or creating a policy;

C. Configuring a service;

D. Removing and re-installing the operating system component;

E. Creating or fixing a firewall rule;

F. Setting or repairing autologon options; or

G. Other repair operations.

In accordance with aspects of the subject matter described herein, the self-healing actions described herein may be performed at any stage of loading and executing operating system components. For example, the self-healing actions may occur after the bootloader has loaded initial code but before system drivers and services have begun executing. As another example, the self-healing actions may occur after the bootloader and one or more system drivers have begun executing but before other operating system components have begun executing. As another example, the self-healing actions may occur after the system drivers have been instantiated but before one or more services have been started.

The examples above are not intended to be all-inclusive or exhaustive of times at which the self-healing actions may occur.

4. After the self-healing actions are completed, indicating that the second set of one or more operating system components are allowed to execute (e.g., block 335).

At block 340, other actions, if any, may be performed.

Turning to FIG. 4, the actions begin at block 405. At block 410, a check is performed as to whether self-healing actions are occurring. For example, referring to FIG. 2, various components (e.g., the bootloader, the driver manager 203, the service manager 204, or other components) may check whether self-healing actions are occurring before beginning the execution of other operating system components.

At block 415, if self-healing actions are occurring, the actions may continue at block 420; otherwise, the actions may continue at block 425.

At block 420, waiting is performed until the self-healing actions have completed. For example, referring to FIG. 2, the services manager 204 upon determining that self-healing actions are occurring may not begin the execution of any more services until the self-healing actions are completed.

At block 425, normal activities proceed. For example, referring to FIG. 2, if the driver manager 203 determines that self-healing actions have completed, the driver manager 203 may continue instantiating drivers as needed.

At block 430, other actions, if any, may be performed.

As can be seen from the foregoing detailed description, aspects have been described related to self-healing. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

commencing loading of an initial set of operating system components into a computer memory, the operating system components including a first set of one or more operating system components and a second set of one or more operating system components; and automatically, and without user interaction, after the first set of one or more operating system components have begun executing and before the second set of one or more operating system components begin executing, performing self-healing actions, the self-healing actions comprising:

indicating that the second set of one or more operating system components are to wait before executing, checking whether one or more of the operating system components are in need of repair, if an operating system component is in need of repair, then repairing the operating system component, and indicating that the second set of one or more operating system components are allowed to execute.

2. The method of claim 1, wherein the self-healing actions further comprise:

checking whether a management shell of the operating system is executing, the management shell configuring at least remote desktop listeners for allowing remote desktop connections; and if the operating system shell is executing, aborting the self-healing actions immediately.

3. The method of claim 1, wherein repairing the operating system component comprises creating or re-creating a configuration file associated with the operating system component.

4. The method of claim 1, wherein repairing the operating system component comprises setting a policy.

5. The method of claim 1, wherein repairing the operating system component comprises configuring a service.

6. The method of claim 1, wherein repairing the operating system component comprises removing and re-installing the operating system component.

7. The method of claim 1, wherein repairing the operating system component comprises creating or fixing a firewall rule.

8. The method of claim 1, wherein repairing the operating system component comprises setting or repairing autologon options.

9. The method of claim 1, wherein the first set of one or more operating system components comprises a boot loader and the second set of one or more operating system components comprises system drivers and services.

10. The method of claim 1, wherein the first set of one or more operating system components comprises a boot loader and system drivers and the second set of one or more operating system components comprises services.

11. In a computing environment, a system, comprising:

one or more computers having at least one processing unit configured to execute code to instantiate an operating system on the one or more computers;

a bootloader structured to initiate loading of an initial set of operating system components into memory, the operating system components including a first set of one or more operating system components and a second set of one or more operating system components;

a self-healing module structured, when executed, to perform actions encoded in the code, the actions comprising:

automatically, and without user interaction, after the first set of one or more operating system components have begun executing and before the second set of one or more operating system components begin executing, performing self-healing actions, the self-healing actions comprising:
indicating that the second set of one or more operating system components are to wait before executing,
checking whether one or more of the operating system components are in need of repair,
if an operating system component is in need of repair, then repairing the operating system component, and
indicating that the second set of one or more operating system components are allowed to execute.

12. The system of claim 11, further comprising a driver manager structured to execute device driver code stored in the memory, the second set of operating system components including the driver manager, the self-healing module further structured to execute before the device driver code is executed.

13. The system of claim 11, further comprising:
a driver manager operable to execute device driver code stored in the memory, the first set of operating system components including the driver manager; and
a service manager operable to execute service code stored in the memory, the second set of operating system components including the service manager, the self-healing module further structured to execute after the device driver code is executed and before the service code is executed.

14. The system of claim 11, wherein the self-healing module is further structured, when executed, to perform additional actions, the additional actions comprising:
checking whether a management shell of the operating system is executing, the management shell configuring at least remote desktop listeners for allowing remote desktop connections; and
if the operating system shell is executing, aborting the self-healing actions immediately.

15. A computer storage medium having computer-executable instructions, which when executed perform actions, comprising:
executing a bootloader to commence loading components of an operating system into memory;
then, instantiating at least one device driver of the operating system;
after instantiating the at least one device driver, automatically, and without user interaction, performing self-healing actions on the operating system, the self-healing actions comprising:
indicating that other operating system components are to wait until the self-healing actions are completed before executing;
checking whether one or more of the operating system components are in need of repair,
if an operating system component is in need of repair, then repairing the operating system component;
after the self-healing actions are completed, indicating that the other operating system components are allowed to begin executing.

16. The computer storage medium of claim 15, further comprising:
checking whether a management shell of the operating system is executing, the management shell configuring at least remote desktop listeners for allowing remote desktop connections; and
if the operating system shell is executing, aborting the self-healing actions immediately.

17. The computer storage medium of claim 15, wherein the self-healing actions occur after all system drivers have begun executing.

18. The computer storage medium of claim 15, further comprising checking by the management shell whether the self-healing actions are executing and, if so, waiting until the self-healing actions have completed.

19. The computer storage medium of claim 15, wherein repairing the operating system component comprises removing and re-installing the operating system component.

20. The computer storage medium of claim 15, wherein repairing the operating system component comprises creating or fixing a firewall rule.

* * * * *